(12) United States Patent
Raizen et al.

(10) Patent No.: US 9,460,028 B1
(45) Date of Patent: Oct. 4, 2016

(54) NON-DISRUPTIVE AND MINIMALLY DISRUPTIVE DATA MIGRATION IN ACTIVE-ACTIVE CLUSTERS

(71) Applicant: EMC Corporation, Hopkinton, MA (US)

(72) Inventors: Helen S. Raizen, Jamaica Plain, MA (US); Assaf Natanzon, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 174 days.

(21) Appl. No.: 13/727,884

(22) Filed: Dec. 27, 2012

(51) Int. Cl.
   *G06F 12/16* (2006.01)

(52) U.S. Cl.
   CPC ................................. *G06F 12/16* (2013.01)

(58) Field of Classification Search
   CPC .............................. G06F 11/14; G06F 11/20
   See application file for complete search history.

(56) References Cited

U.S. PATENT DOCUMENTS

| | | | |
|---|---|---|---|
| 6,108,748 A * | 8/2000 | Ofek et al. | 711/112 |
| 6,269,431 B1 * | 7/2001 | Dunham | G06F 11/1469 |
| | | | 707/999.202 |
| 7,076,690 B1 * | 7/2006 | Todd | G06F 3/0617 |
| | | | 714/13 |
| 7,080,225 B1 * | 7/2006 | Todd | G06F 3/061 |
| | | | 711/154 |
| 7,093,088 B1 * | 8/2006 | Todd | G06F 11/1443 |
| | | | 707/999.202 |
| 7,770,053 B1 * | 8/2010 | Bappe | G06F 11/0793 |
| | | | 714/3 |
| 7,805,583 B1 * | 9/2010 | Todd | G06F 3/0617 |
| | | | 711/161 |
| 7,809,912 B1 | 10/2010 | Raizen et al. | |
| 7,882,286 B1 * | 2/2011 | Natanzon | H04L 67/1095 |
| | | | 710/74 |
| 7,890,664 B1 | 2/2011 | Tao et al. | |
| 7,904,681 B1 | 3/2011 | Bappe et al. | |
| 7,945,669 B2 * | 5/2011 | Bober et al. | 709/226 |
| 2004/0080558 A1 * | 4/2004 | Blumenau | G06F 11/1435 |
| | | | 347/19 |
| 2004/0088417 A1 * | 5/2004 | Bober | H04L 69/329 |
| | | | 709/227 |
| 2005/0193181 A1 * | 9/2005 | Kaneda et al. | 711/162 |

OTHER PUBLICATIONS

"EMC® RecoverPoint/SE for the CLARiiON CX4. White Paper." Published by EMC Corporation in Feb. 2010. http://www.emc.com/collateral/software/white-papers/h5703-recoverpoint-with-clariion-cx4-wp.pdf.*

(Continued)

*Primary Examiner* — Midys Rojas
*Assistant Examiner* — Jane Wei
(74) *Attorney, Agent, or Firm* — BainwoodHuang

(57) ABSTRACT

Data migration is performed in a cluster of host computers each using a mechanism associating data with a source LUN. During a synchronization operation the contents of the source LUN are copied to the target LUN while ongoing normal source LUN writes are cloned to the target LUN. A datapath component of an agent coordinates the writes at the target LUN to maintain data consistency. Upon completion of synchronization, each host stops the write cloning and disables access to the source LUN, in conjunction with a modification of the mechanism to newly associate the data with the target LUN. Depending on the type of mechanism and system, the modification may be done either disruptively or non-disruptively, i.e., with or without stopping normal operation of software of the host computers.

19 Claims, 9 Drawing Sheets

(56) References Cited

OTHER PUBLICATIONS

"ESXi Configuration Guide." Published by VMware on Jul. 13, 2010. https://www.vmware.com/support/pubs/vs_pages/vsp_pubs_esxi41_i_vc41.html.*

"EMC® RecoverPoint/SE for the CLARiiON CX4. White Paper." Published by EMC Corporation in Feb. 2010. <http://www.emc.com/collateral/software/white-papers/h5703-recoverpoint-with-clariion-cx4-wp.pdf>.*

"ESXi Configuration Guide." Published by VMware on Jul. 13, 2010. <https://www.vmware.com/support/pubs/vs_pages/vsp_pubs_esxi41_i_vc41.html>.*

* cited by examiner

NON-DISRUPTIVE AND MINIMALLY DISRUPTIVE DATA MIGRATION IN ACTIVE-ACTIVE CLUSTERS

BACKGROUND

The present invention relates to migration of data from a source data storage device to a target data storage device in a data processing system.

Data migration techniques are used to move or "migrate" data from one storage device (or logical unit) to another for any of a variety of purposes, such as upgrading storage hardware or information lifecycle management. Generally, migration involves synchronizing the target device to the source device, i.e., achieving an operating state in which the target device stores the same data as the source device, and then switching operation so that subsequent accesses of the data are directed to the target device instead of the source device. Once the switching is successfully accomplished, the source device can be taken out of service or put to some other use.

Non-disruptive migration is performed while there is ongoing application-level access to the data stored on the source storage device. In non-disruptive migration, there are two parts to achieving synchronization—existing data on the source device is copied to the target device, and ongoing application writes of new data are "cloned", i.e., sent to both the source and target devices. Non-disruptive migration also requires a non-disruptive mechanism for switching operation to the target device. Example descriptions of non-disruptive migration can be found in the following US patents, whose entire contents are incorporated by reference herein:
  1. U.S. Pat. No. 7,904,681 Methods and systems for migrating data with minimal disruption
  2. U.S. Pat. No. 7,809,912 Methods and systems for managing I/O requests to minimize disruption required for data migration
  3. U.S. Pat. No. 7,770,053 Systems and methods for maintaining data integrity during a migration Clustering is a technique used in computer systems to provide certain desirable functionality and characteristics from the perspective of external users. Advantages include increased performance and availability over non-clustered systems. Two general types of clusters are "failover" and parallel or "active-active" clusters. In a failover cluster, all cluster nodes may be aware of a given storage device accessible in the cluster, but in general a given storage device is accessed by only one node during operation. In the event of node failure, a failover mechanism causes ownership of the storage device to be transferred to a new node that has assumed responsibility for the workload of the failed node. Due to the single-node access, there is no need for synchronizing accesses among the hosts. In active-active clusters, storage devices may be actively accessed from all nodes in the cluster, and the operating software (e.g., application software) of the nodes is responsible for synchronizing access to shared storage resources.

SUMMARY

It is desirable to support data migration in a cluster environment, but providing such support can present certain challenges. Non-disruptive migration involves several sensitive operations where input/output (I/O) is temporarily suspended and from which it is necessary to recover in a non-obtrusive manner. The fine control over I/O and the possibility of aborting and restarting a migration at different steps of the process would require significant communication and coordination among the nodes of the cluster, most of it needed only for the unlikely event of a failure and therefore constituting inefficient use of system resources.

Methods and apparatus are disclosed for migrating data from a source LUN to a target LUN in a data processing system having a cluster of multiple host computers, where the data is accessed by software of the host computers using a mechanism initially associating the data with the source LUN as the location of the data in the system. An example of such a mechanism is a "pseudoname" as described in the above-referenced U.S. Pat. No. 7,904,681, and other examples are described herein.

A method includes commanding a kernel-level migration component of each host computer to begin cloning source LUN writes to the target LUN, each write to be cloned by writing a duplicate of each source LUN write to the target LUN. Subsequently, a LUN copying operation and target LUN write coordination by an agent in the system are initiated. The LUN copying operation reads data from the source LUN and writes the data to the target LUN so as to transfer all existing data. The target LUN write coordination coordinates target LUN writes from the LUN copying operation with target LUN writes from the cloning of source LUN writes, so as to ensure consistency between the source LUN and target LUN.

Upon completion of the LUN copying operation, the kernel-level component of each host computer is commanded to stop the cloning of source LUN writes and to disable access to the source LUN by the host computer software, in conjunction with a modification of the mechanism so as to newly associate the data with the target LUN as the location of the data in the system. Depending on the type of mechanism and system, the modification may be done either disruptively or non-disruptively, i.e., with or without stopping normal operation of the data processing system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
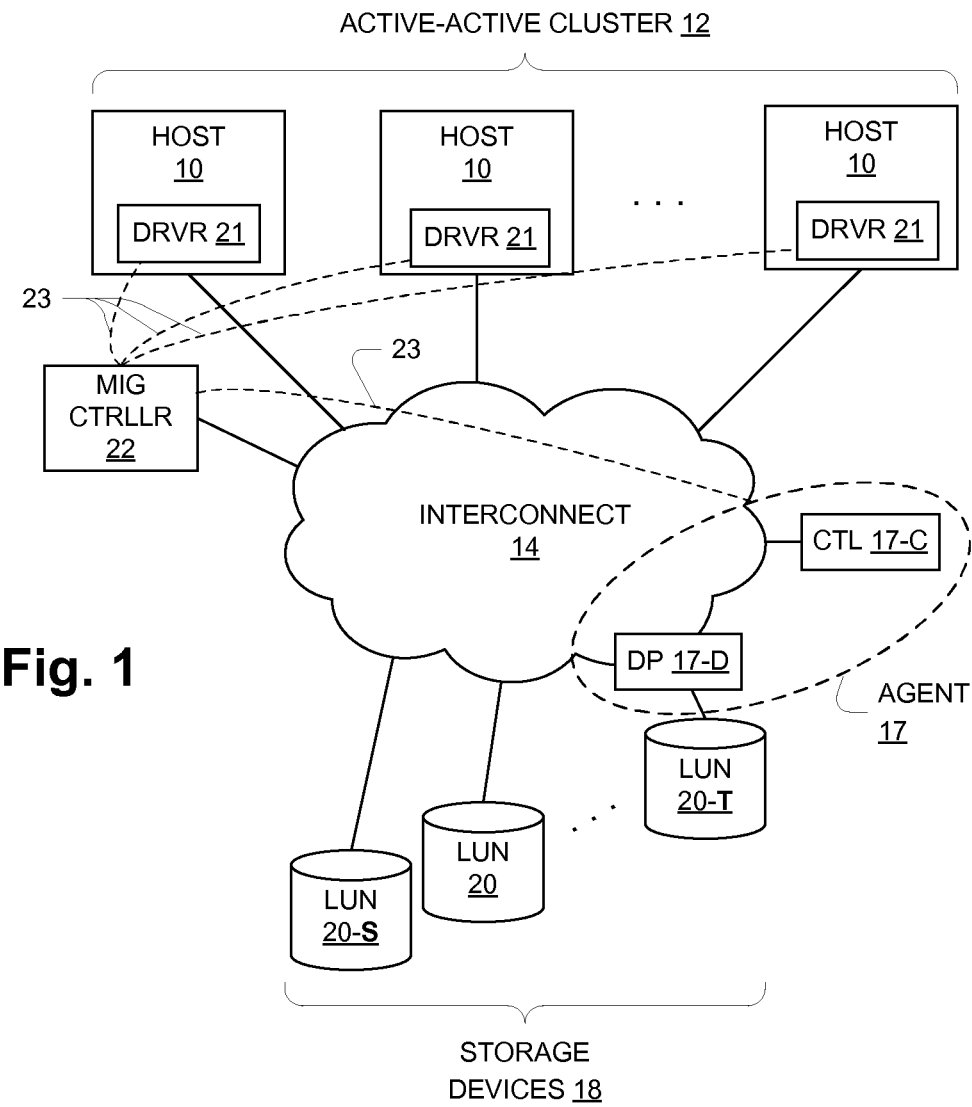
FIG. 1 is a block diagram of a data processing system.

FIG. 1 shows a data processing system having a set of host computers (HOSTs) 10 which are configured as a group referred to as an "active-active cluster" 12. The hosts 10, which are also referred to as "nodes" herein, are connected by interconnect 14 to storage devices 18 which are also referred to as logical units or LUNs 20. Each host 10 includes a storage device driver (DRVR) 21 providing low-level functionality required for I/O access to storage devices 18. Examples are described below. In one embodiment, the cluster 12 may be formed by a plurality of physical servers each executing virtualization software enabling it to host one or more virtual machines. An example of such virtualization software is ESX Server® sold by VMWare, Inc. In another embodiment, the cluster 12 may implement a database clustering solution known as Oracle RAC from Oracle Corporation.

The interconnect 14 includes one or more storage-oriented networks providing pathways for data transfer among the hosts 10 and devices 18. An example of the interconnect 14 is a FibreChannel storage area network (SAN), either by itself or in conjunction with Ethernet or other network components. The devices 18 are logical units of storage allocated for uses such as storing databases, file systems, etc. used by application programs executing on the hosts 10. Generally, the devices 18 are visible to the hosts 10 as block-oriented storage devices.

The LUNs 20 include a source LUN 20-S and a target LUN 20-T participating in a migration operation by which the target LUN 20-T functionally replaces the source LUN 20-S in the system. It is assumed that prior to migration, the source LUN 20-S stores a data resource that is accessed by operating software (e.g., application software) executing on the hosts 10 using a mechanism that specifically associates the application-visible data resource with the source LUN 20-S. Specific examples of such mechanisms are described below. A migration operation moves the data resource to the target LUN 20-T and changes the mechanism so that future application accesses of the data resource are directed to the target LUN 20-T rather than to the source LUN 20-S. Reasons for such migration of storage resources include a desire for additional storage capacity or improved performance, or to upgrade to more current and well-supported hardware, for example. In some cases the source LUN 20-S is to be removed from the system, although in other cases it may be maintained and reused for other purposes.

In the active-active cluster 12, there may be applications executing simultaneously on different hosts 10 having access to the source LUN 20-S. One aspect of the migration operation is to coordinate certain operations of the hosts 10 to ensure that there is no data loss or data incoherency created, which could have any of several deleterious effects as generally known in the art. These aspects of the migration operation are described below.

For migration operation, the system includes an actor referred to as a migration controller (MIG CTRLLR) 22 as well as an off-host agent 17. As indicated by lines 23, during a migration the migration controller 22 communicates with the agent 17 as well as with the drivers 21. In some embodiments the migration controller 22 may be implemented by software executing on one of the hosts 10, whereas in other embodiments it may be realized by software executing on a separate physical or virtual device in the system (referred to below as a "migration appliance"). The agent 17 generally includes a control component (CTL) 17-C and a datapath component (DP) 17-D. The datapath component 17-D may be realized by software/firmware executing on a storage controller included in a storage housing or "array" that houses the target LUN 20-T. The control component 17-C may be formed by software executing on a separate controller device or "agent appliance" functionally interconnected to the hosts 10 and devices 18.

This connection may be via the interconnect 14, or in other embodiments via other connections apart from the datapath. In one embodiment, the agent 17 may be realized using the RecoverPoint™ product of EMC Corporation. In the RecoverPoint architecture, the datapath component 17-D is referred to as a "write splitter" or "splitter", and the control component 17-C resides on a device referred to as the "RecoverPoint appliance" or RPA. In some embodiments, the migration appliance and agent appliance may be the same physical or virtual device.

The agent 17 plays two important roles in the migration operation described herein. First, the control component 17-C has initiator access to the source and target LUNs 20-S, 20-T, and it includes functionality for bulk copying of data from the source LUN 20-S to the target LUN 20-T. Second, the datapath component 17-D serves as a single point via which the hosts 20 and the control portion 17-C access the target LUN 20-T. As described in more detail below, during migration the datapath component 17-D is responsible for coordinating the cloned writes from the hosts 10 with the writes of the copying operation from the control component 17-C to ensure data integrity.

Figure 2:
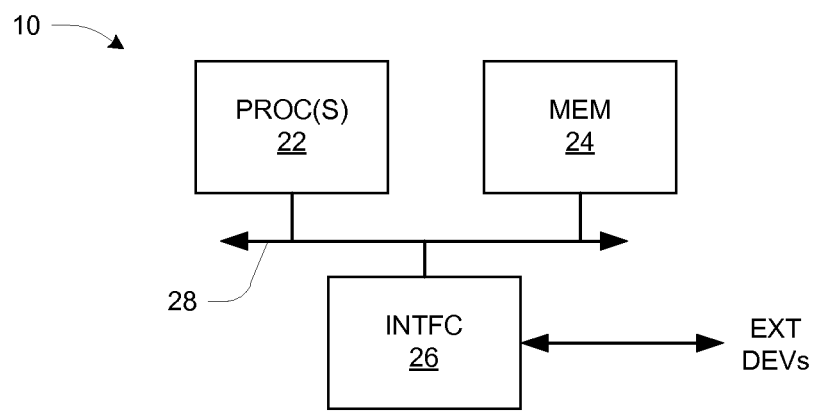
FIG. 2 is a block diagram of a hardware organization of a host.

FIG. 2 shows an example configuration of a physical computer such as a host 10 from a computer hardware perspective. The hardware includes one or more processors 22, memory 24, and interface circuitry 26 interconnected by data interconnections 28 such as one or more high-speed data buses. The interface circuitry 26 provides a hardware connection to the interconnect 14 (FIG. 1) and perhaps other external devices/connections (EXT DEVs). The processor(s) 22 with connected memory 24 may also be referred to as "processing circuitry" herein. In operation, the memory 24 stores data and instructions of system software (e.g., operating system) and one or more application programs which are executed by the processor(s) 22 to cause the hardware to function in a software-defined manner. Thus the computer hardware executing instructions of a migration application, such as described below, can be referred to as a migration circuit or migration component, and it will be understood that a collection of such circuits or components can all be realized and interact with each other as one or more sets of computer processing hardware executing different computer programs as generally known in the art.

Figure 3:
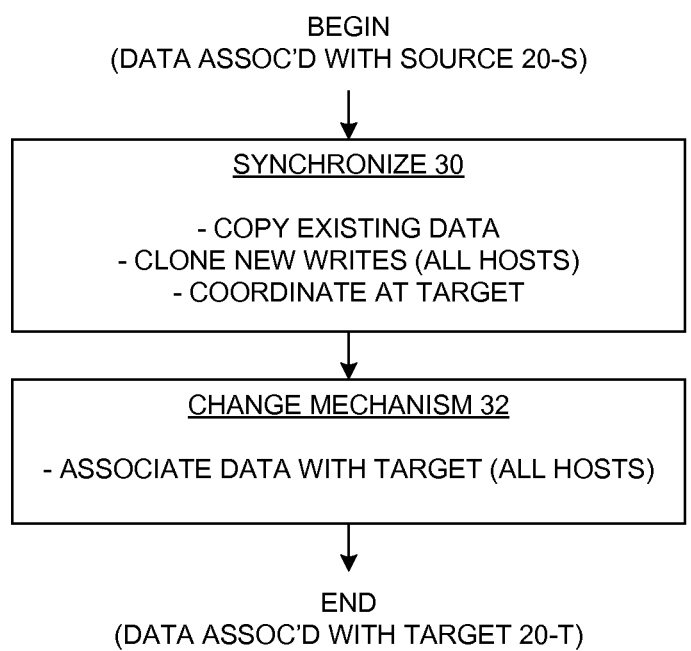
FIGS. 3 through 5 are flow diagrams for a migration operation.

FIG. 3 illustrates a migration operation at a high level. As it commences, the application-visible data is associated with the source LUN 20-S as briefly described above. At 30, the target LUN 20-T is synchronized to the source LUN 20-S. Synchronization has three major sub-functions: (1) copying existing data from the source LUN 20-S to the target LUN 20-T; (2) for ongoing host writes of new data to the source LUN 20-S, cloning these writes to the target LUN 20-T; and (3) at the target LUN 20-T, coordinating the writes from both (1) and (2) to ensure consistency between the source LUN 20-S and the target LUN 20-T. Referring back to FIG. 1, these functions are performed respectively by (1) the control component 17-C of the agent 17, (2) a kernel-level component in each host 10, and (3) the datapath component 17-D of the agent 17. Details are provided below.

Once the target LUN 20-T is synchronized to the source LUN 20-S, at 32 a change is made to the mechanism to newly associate the application-visible data with the target LUN 20-T. Future application-level writes to the data are automatically directed to the target LUN 20-T rather than to the source LUN 20-S. After any necessary cleanup, the source LUN 20-S can be retired or put to other use. Details of the change process are also described below.

Figure 4:
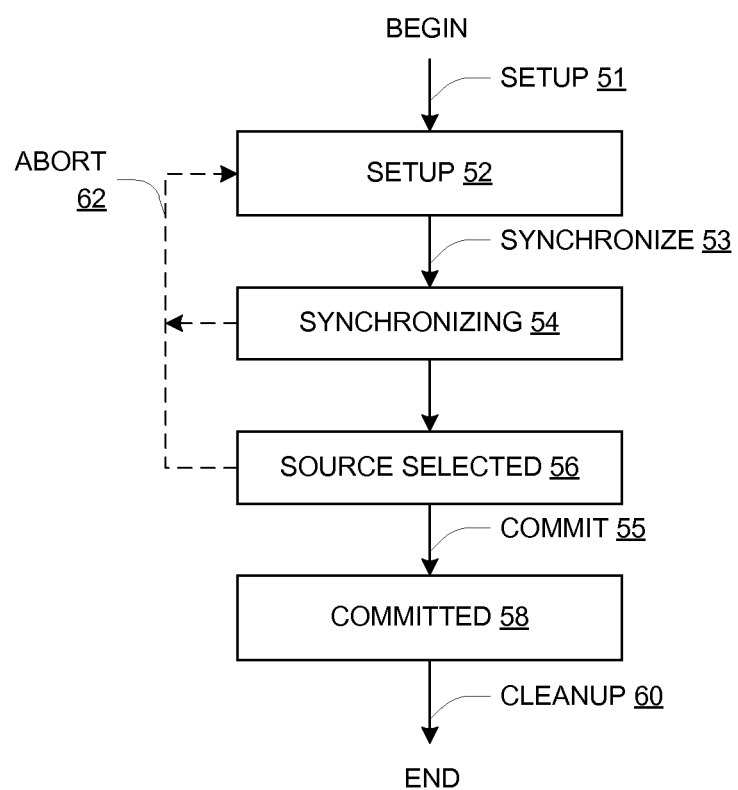

FIG. 4 illustrates progression of a migration operation according to one embodiment, specifically a "non-disruptive" migration that permits ongoing operation of any applications using the data resource initially associated with the source LUN 20-S. Operation proceeds through a Setup state 52, a Synchronizing state 54, a Source Selected state 56 and a Committed state 58 as shown. Transitions are effected in part by a human or machine user via a command line interface (CLI) or API of the migration controller 22 (FIG. 1). Thus the transition between successive operating states may occur in response to a user's monitoring for completion of operations in one state and commanding the transition to the next state. Suitable CLI or API commands for the process of FIG. 4 might include Setup 51, Synchronize 53, Commit 55 and Cleanup 60 for example. In one embodiment, the operations performed in response to the Setup command 51 create an identifier or "handle" for each new migration operation that is initiated. Subsequent commands may use the handle to identify this migration operation as distinct from other migration operations that may be occurring at the same time. The handle implicitly identifies the source LUN 20-S and target LUN 20-T as the devices involved in the migration.

It is assumed that prior to the process both the source and target LUNs 20-S, 20-T have become configured for use by the hosts 10. The contents (data) of the source LUN 20-S constitute a data resource for operating software of the hosts 10, and there is some mechanism that associates this data resource with the source LUN 20-S as the location of the resource. Different mechanisms have different properties and may require different handling during a migration operation. One aspect of a mechanism is whether it is location-dependent or location-independent, i.e., whether the mechanism includes physical device identifying information. Another aspect of a mechanism is whether it involves a "name" used by applications to identify the location of application data to lower-level components such as the drivers 21, or rather a "signature" stored with application data on a device 20 used by operating software for purposes such as detection of duplication or other integrity/consistency checking. In the process of FIG. 4, it is assumed that whatever mechanism is used, there is a way to non-disruptively make a change to the mechanism as required to complete migration. Different specific mechanisms and the manner in which they are handled in non-disruptive as well as disruptive migrations are discussed below.

Referring to FIG. 4, in response to the Setup command 51 the migration controller 22 verifies that the target LUN 20-T is a suitable target, such as checking that its size (capacity) is at least the size of the source LUN 20-S. It then communicates with the agent 17 (FIG. 1) to instruct it to establish a replication relationship between the source LUN 20-S and the target LUN 20-T. The agent 17 may return an explicit response indicating success or failure in establishing the replication relationship. Further operation as described below assumes successful completion of this task.

In response to the Synchronize command 53, the migration controller 22 commands certain kernel-level components of the driver 21 of each host 10 to prevent application access to the target LUN 20-T and to begin cloning writes of the source LUN 20-S to the target LUN 20-T. Thus when a given host 10 writes to the source LUN 20-S, the driver 21 of that host 10 performs the write operation on the source LUN 20-S and performs the same write operation on the target LUN 20-T. In one embodiment it is required that the writes occur in that order, i.e., first to the source LUN 20-S and then to the target LUN 20-T, and that the write to the target LUN 20-T only occur if the write to the source LUN 20-S completes successfully. In this case, the agent 17 may operate in a particular advantageous fashion as described below. It should be noted that each host 10 may need to temporarily suspend input/output to the source and target LUNs 20-S, 20-T to transition into this operating mode (target access disabled and write cloning active), but in general it is not required that such suspension occur across all hosts 10 at the same time. However, it is necessary that each host 10 has transitioned into this operating mode before migration continues.

The migration controller 22 then communicates with the control component 17-C of the agent 17 (FIG. 1) to instruct it to begin the copying operation to copy all existing contents of the source LUN 20-S to the target LUN 20-T. The control component 17-C initiates the copying. At this point the migration advances to the Synchronizing state 54.

During the Synchronizing state 54, the contents of the target LUN 20-T are made identical to the contents of the source LUN 20-S. This is achieved by duplicating or "cloning" any host writes performed on the source LUN 20-S to the target LUN 20-T, as well as copying all the existing (previously written) data from the source LUN 20-S to the target LUN 20-T. Synchronization is complete when all existing data has been copied. However, all application writes continue to be duplicated.

The migration controller 22 may monitor the progress of the copying operation or at least become notified of its completion. For monitoring, the migration controller 22 may periodically (or upon user command) send a query message to the controller component 17-C to which the agent 17 responds with some type of progress or completion indicator. In one embodiment, the controller component 17-C returns a value representing the number of blocks of the source LUN 20-S that have been copied. The migration controller 22 knows the size of the source LUN 20-S and can compute a percentage or fraction of completion.

Once synchronization is complete, the migration progresses to a Source Selected state 56 in which reads to the data resource continue to be directed to the source LUN 20-S while writes to the resource continue to be duplicated to both the source LUN 20-S and target LUN 20-T. Generally, this state may last only as long as deemed necessary by the human or machine user (e.g., a storage administrator user).

When the user is ready, the user issues a Commit command 55. This causes the following operations by the driver 21 of each host 10 under control of the migration controller 22:

1. I/O to the data resource stored on the source LUN 20-S is initially suspended on every host 10 in the cluster 12. In particular, a drain and suspend operation is performed, such that newly arriving I/Os are held and all I/Os in flight are completed.
2. Access control is changed to now permit access to the target LUN 20-T and disallow access to the source LUN 20-S. Write cloning for the source LUN 20-S is stopped on every host 10 of the cluster 12
3. The mechanism associating the data resource with the source LUN 20-S is changed so as to newly associate the data resource with the target LUN 20-T on every host 10 of the cluster 12. This change is done without requiring any re-configuring and restarting of the host applications accessing the data resource. Specific examples are given below.
4. I/O to the data resource is then resumed on every host 10 of the cluster 12.

The above operations require proper sequencing. In particular, they are performed in three sequential phases, each of which must be complete for every host 10 of the cluster 12 before the step(s) of the next phase can be initiated:

Phase 1—Step 1
Phase 2—Steps 2 and 3
Phase 3—Step 4

The migration controller 22 may take action to initiate each phase in sequence, and leave any intra-phase sequencing to each host 10. Thus in phase 2, steps 2 and 3 may be performed in any order. Features may be incorporated that protect the integrity of the process in the event of a host reboot during phase 2. In some embodiments, I/O suspension does not survive a reboot, and therefore without such protective features there is a possibility of inconsistency between the source LUN 20-S and the target LUN 20-T at the point of commitment. The protective features are preferably instituted at the end of Phase 1 and removed at the beginning of Phase 3. An example of such protective features is given in U.S. patent application Ser. No. 13/575,740 filed Jun. 28, 2012. In an embodiment in which I/O suspension survives a reboot, such protective mechanisms may not be necessary.

Once the above operations have been performed, the migration enters the Committed state 58. In this state, application I/O is automatically directed to the target LUN 20-T and not to the source LUN 20-S, by virtue of the change to the association mechanism. The target LUN 20-T will store all newly written data, and no synchronization is maintained with the source LUN 20-S. It is generally not possible to revert to operating with the source LUN 20-S.

A cleanup command 60 initiates a cleanup operation to remove any remaining metadata associating the source LUN 20-S with the storage resource that has been migrated. At that point, the source LUN 20-S may be removed from the system, or it may be re-configured for another use in the system. One important task performed during cleanup is to erase any information on the source device 20-S that might cause it to be identified mistakenly as the storage resource that has been migrated to the target device 20-T. Earlier in the migration, access control prevents this "mistaken identity". Also, either at this time or earlier during processing of the Commit command 55, the source/target relationship previously established in the agent 17 is removed. If done during the Commit command 55, it can be done after I/O is resumed at each host 10, as it does not require IO suspension. In connection with potential re-use of the source LUN 20-S, the contents of the source LUN 20-S may be erased, perhaps with replacement by a known pattern (such as all zeros) for security or other operational reasons.

The process of FIG. 4 includes an abort path 62 leading from the Synchronizing state 54 and Source Selected state 56 back to the Setup state 52. Aborting may occur by user command or by automatic operation when problems are encountered during the process. For example, if either the source LUN 20-S or target LUN 20-T fails or otherwise becomes unavailable during the process, such failure may be detected either manually or automatically and lead to aborting the migration.

More particularly with respect to failures, a device fault is a write failure to either the source or target LUNs 20-S, 20-T. Since all writes are duplicated, migration can only proceed if both writes succeed. If one succeeds and the other fails, migration must be aborted. In this case, the migration will go into a "target device faulted" state at this point, and the user will have to execute the abort and start over, perhaps first curing whatever problem caused the fault. The copy operation could also fail, due to a read failure on the source LUN 20-S or a write failure on the target LUN 20-T. This is not a device fault, but it will cause the synchronization to stop. An explanation of the handling of device faults in a non-cluster environment can be found in the above-referenced U.S. Pat. No. 7,770,053.

Device fault handling in the cluster environment may be generally similar to that described in the '053 patent, but there are specific differences. For example, in the non-cluster environment as described in the '053 patent, there is a "target selected" state in addition to a source selected state, and in the target selected state reads are redirected to the target device 20-T while writes are still being cloned and synchronization maintained. If the system should be shut down unexpectedly, upon restart the non-selected side is faulted because there's no guarantee that all writes made it to both sides. Thus the source device is faulted if this occurs during operation in the target selected state. Also, if a fault happens during normal I/O, then the side that fails the write will be faulted, so the source side is faulted when operating in the source selected state and a write to the source device fails. In contrast, in the cluster environment as described herein, operation proceeds directly from the Source Selected state 56 to the Committed state 58 or Committed and Redirected state 64; there is no target selected state. Only the target LUN 20-T is ever faulted when a write fails, no matter which side the write fails on.

Figure 5:
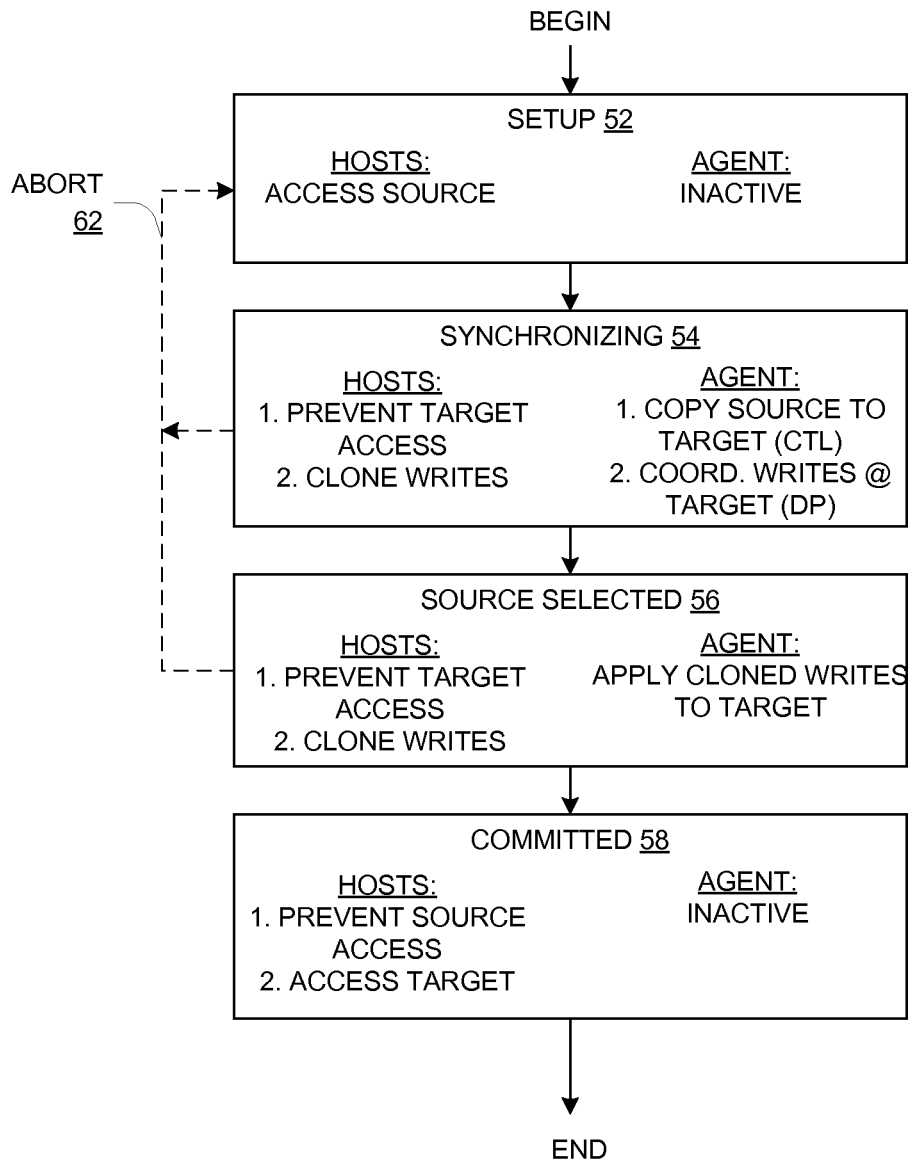

FIG. 5 presents the same flow as in FIG. 4 with summaries of the actions of the hosts 10 and of the agent 17 in each state.

In the Setup state 52, the hosts 10 continue to access the data resource on source LUN 20-S, and the agent 17 is inactive. The agent 17 has previously set up the replication relationship between the source LUN 20-S and the target LUN 20-T and is awaiting further instruction as described above with reference to FIG. 4.

During the Synchronizing state 54, each host 10 prevents application access to the target LUN 20-T and is cloning the writes for the source LUN 20-S to the target LUN 20-T. The controller component 17-C of agent 17 is performing the copying operation and reports progress to the migration controller 22. The datapath component 17-D of agent 17 coordinates the writing to the target LUN 20-T. An example of this coordinating is described below.

During the Source Selected state 56, the hosts 10 continue to prevent access to the target LUN 20-T and to clone writes. The agent 17 applies the cloned writes to the target LUN 20-T.

During the Committed state 58, the hosts 10 prevent access to the source LUN 20-S and direct I/O for the data resource to the target LUN 20-T. No write cloning is performed. The agent 17 is inactive (assuming termination of the source-target relationship in agent 17 at the end of the Commit step).

During the Committed state 58, read and write accesses by the hosts 10 to the data resource formerly stored on the source LUN 20-S are directed to the target LUN 20-T. The target LUN 20-T continues to have the correct current data as seen by the rest of the system, and the source LUN 20-S is no longer synchronized with the target LUN 20-T, because writes are no longer directed to the source LUN 20-S.

Figure 6:
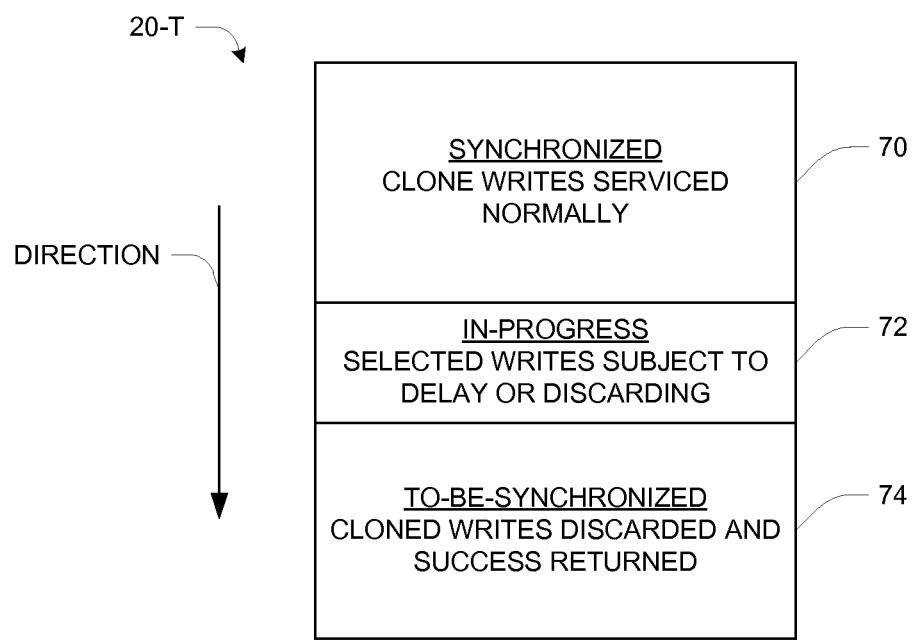
FIG. 6 is a schematic diagram showing regions of a target storage device during migration.

FIG. 6 is used to illustrate operation of the agent 17 during the Synchronizing state 54 of FIGS. 4-5. As indicated above, it is important that the cloned writes and the writes of the copying operation be coordinated in a manner that maintains data coherency. In the absence of a particular mechanism for maintaining coherency, it would be possible that a cloned write from operating software of a host 10 could be applied to the target LUN 20-T, and then the same location could be overwritten with older data obtained earlier from the source LUN 20-S as part of the copy operation. In that case the result would be as though the cloned write never happened, which is an erroneous condition.

Referring to FIG. 6, the control component 17-C performs the copying operation by stepping linearly through the contents of the source LUN 20-S, such as in order of increasing block addresses. The direction of copying to the target LUN 20-T is indicated by the arrow DIRECTION. Additionally, copying occurs in multi-block chunks, such as chunks 1 MB in size for example. The control component 17-C and datapath component 17-D maintain information such as pointers that divide the target LUN 20-T into three regions as shown: a synchronized region 70 of chunks whose contents have already been copied to the target 20-T; an in-progress region 72 for a chunk currently being synchronized (i.e., for which the data is being copied from the source LUN 20-S to the target LUN 20-T); and a to-be-synchronized region 74 of chunks whose contents have not yet been copied to the target LUN 20-T. The pointers defining these regions are advanced as the copying of each chunk is completed.

To maintain data coherency, the datapath component 17-D handles the cloned writes and the writes from the copying operation differently depending on which region of the target LUN 20-T they are directed to. For those to the synchronized region 70, cloned writes are serviced normally. The copying for this region is already complete, so there is no danger that a write from the copying operation will overwrite the newer data from a cloned write. Writes to the to-be-synchronized region 74 are discarded but with an indication of success being returned to the host 10 that initiated the write. This operation is possible because writes are being cloned by first writing to the source LUN 20-S and then to the target LUN 20-T. A cloned write arriving at the datapath component 17-D has already been applied to the source LUN 20-S, and therefore it will automatically be copied to the target LUN 20-T later as part of the copying operation.

For writes directed to the in-progress region 72, certain writes may be serviced normally and other writes either delayed or discarded for consistency. In one embodiment, all cloned writes to this region 72 are delayed until the copying is complete for this region 72, then the delayed writes are processed normally as for region 70. In another embodiment, the datapath component 17-D performs finer-grained processing to remove delays. For example, the datapath component 17-D might service the cloned writes and maintain a bitmap or other record identifying those blocks of the in-progress region 72 that have been the object of a cloned write. For these blocks, the corresponding writes of the copying operation are discarded (i.e., not performed). This discarding prevents the problem of overwriting newly written data as described above.

Figure 7:
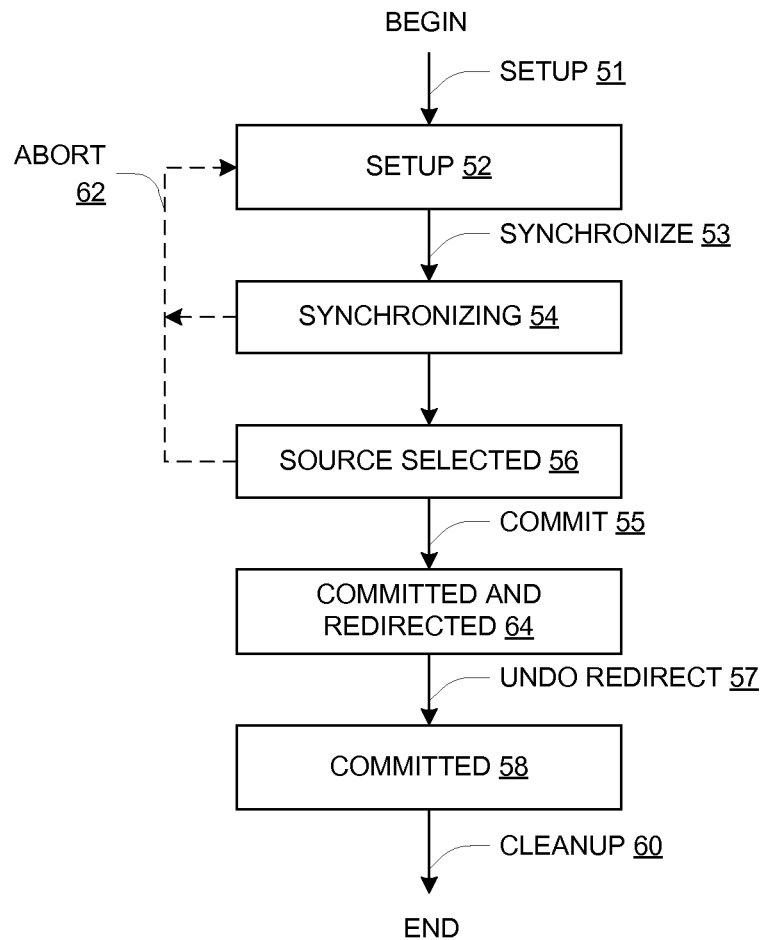
FIGS. 7 and 8 are flow diagrams for a migration operation.
Figure 8:
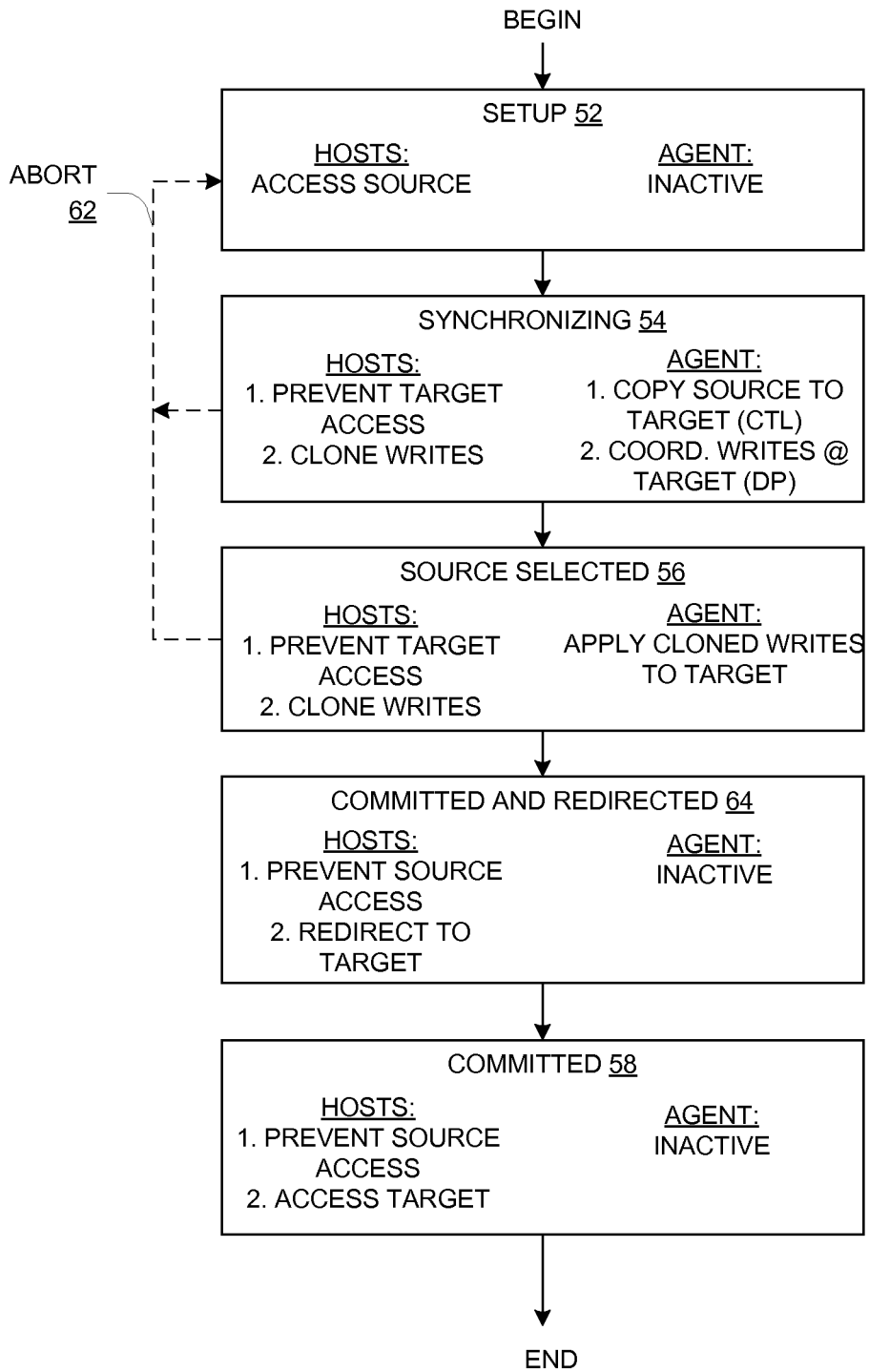

FIGS. 7 and 8 depict an alternative flow for a migration operation usable when it is necessary to stop operation of host software in order to make the change to the mechanism that associates the data resource with a particular LUN 20. This type of migration may be termed "minimally disruptive", as application operation continues during the Synchronizing state 54 and is only stopped as needed to enable transition to a committed state. The flow is similar to that of FIGS. 4-5 except for a transition into a Committed and Redirected state 64 before the transition into the (fully) Committed state 58. In the flow of FIGS. 7 and 8, when the Commit command 55 is issued the migration controller 22 issues messages to the drivers 21 to stop the cloning of writes and to begin redirecting any I/O intended for the source LUN 20-S to the target LUN 20-T. Once the drivers 21 of all hosts 10 are operating in this fashion, the migration enters the Committed and Redirected state 64. Operation continues there until the migration controller 22 subsequently receives an Undo Redirect command 57 and responds by sending messages to the drivers 21 to stop this redirecting. Operation then proceeds to the (fully) Committed state 58 which is as described above. A more detailed explanation of similar operations can be found in the above-referenced U.S. Pat. No. 7,809,912.

The purpose of the Committed and Redirected state 64 is to support a separate task of changing the mechanism that associates the data resource with a source LUN 20-S so that the data resource can be newly associated with the target LUN 20-T. This is the point at which disruption occurs, where for example one or more applications of the hosts 10 may be stopped, reconfigured as necessary to create the new association, and then restarted. Once the change is made, the system can operate correctly using the new association with the target LUN 20-T so that redirection is no longer required.

Once the application is stopped, redirection and changing the association mechanism can generally be done in either order, as redirection has no effect when the application is stopped. In some cases the mechanism may be changed while redirection is still in effect. With some association mechanisms, it may be necessary to stop redirection prior to updating the mechanism. In either case, prior to restarting normal operation (e.g., restarting any applications that are being reconfigured), the Undo Redirect command 57 is used to advance the migration state to Committed 58. Normal operation is then resumed. It should be noted that at least some control communications (such as SCSI Inquiry commands) are not redirected, so that each LUN 20 remains directly accessible for purposes of receiving or providing corresponding control-related information.

As mentioned above, there are several specific cases of mechanisms that associate a data resource with the location (LUN 20) of the data resource. Specific cases may differ along one or more of the following dimensions:

A. An application-visible name used to identify the LUN to which an I/O command is directed, versus a signature stored on a device used to enable an application to be associated with the device.

B. Location dependence versus location independence, i.e., whether the mechanism involves use of a name or signature that contains physical device location information C. Whether the mechanism can be changed non-disruptively or requires disruption of normal operation Specific examples that differ in one or more of the above respects are provided below.

Figure 9:
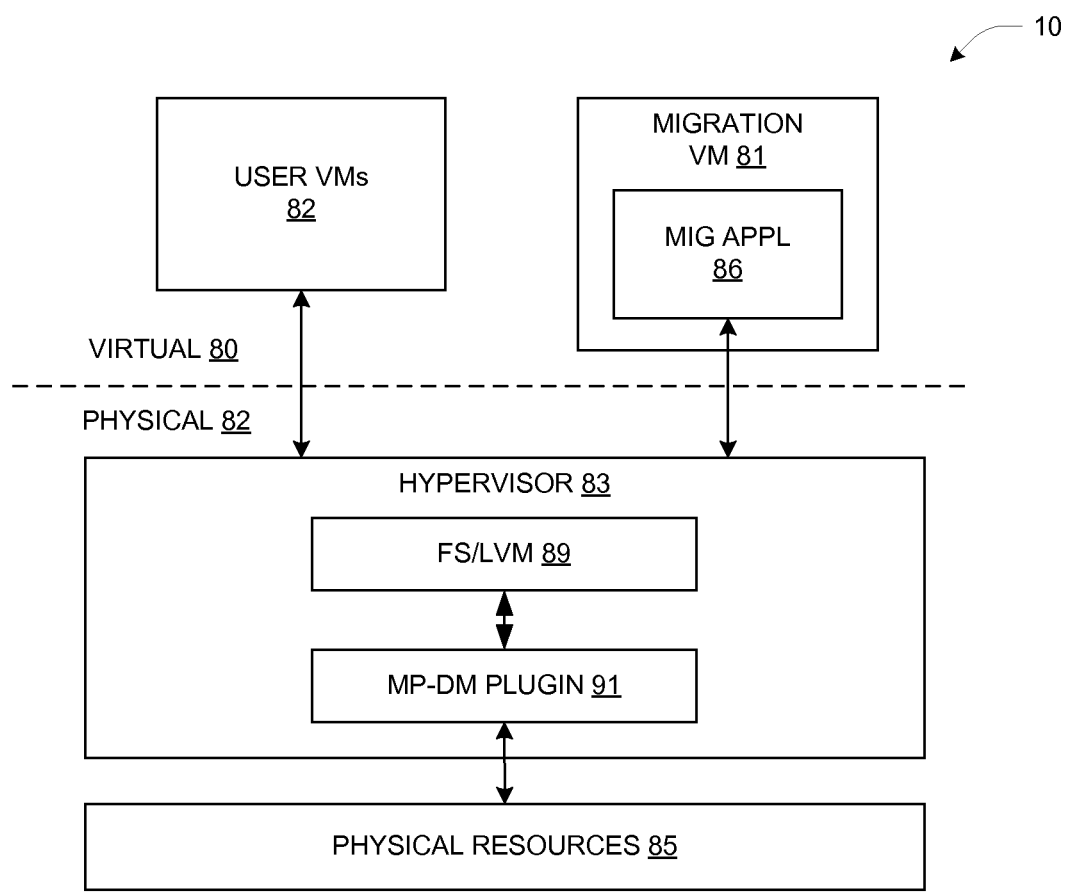
FIGS. 9 and 10 are block diagrams of software organizations of a host.

FIG. 9 shows a view of a host 10 according to a first embodiment, in particular from primarily a software perspective, i.e., a collection of software-implemented functional components as discussed above. The operating environment is divided between a virtual space 80 and physical space 82 as generally known in the art. In virtual space 80 resides one or more user virtual machines (user VMs) 82 executing application programs or "applications" (not shown). Virtual space 80 also includes a migration VM 81 used specifically to execute a migration application 86. The physical space 82 includes physical resources 85 such as processors, memory, input/output circuitry etc. (per FIG. 2 described above). It will be appreciated that the physical resources 85 also include the interconnect 14 and storage devices 18 of FIG. 1. The physical space 82 also includes certain system-level software being executed using the physical resources 85, namely a hypervisor 83 which includes a file system and/or logical volume manager (FS/LVM) 89 and a driver component shown as an MP-DM plugin 91. The MP-DM plugin 91 functions as part of a storage driver 21 as described above with reference to FIG. 1, and provides multi-path (MP) storage access as well as data migration (DM) functionality used in concert with the migration application 86.

The application(s) executed by the user VMs 82 may be conventional user-level applications such as a web server, database application, simulation tool, etc. These access data of so-called virtual disks that are presented by the hypervisor 83. The hypervisor 83 itself employs the FS/LVM 89 and devices 18 of FIG. 1 as the underlying real (physical) file system. The MP-DM plugin 91 is a component working in conjunction with other storage device driver code (not shown) of the hypervisor 83 to carry out the reading and writing of data to/from the devices 18 in operation of the FS/LVM 89. The MP-DM plugin 91 may provide specialized and/or enhanced input/output functionality with respect to the devices 18. For example, it may include multipathing functionality and an ability to access individual LUNs 20 via multiple paths, using the paths for increased performance and/or availability. An example of such multipathing functionality is that provided by the PowerPath®/VE product sold by EMC Corporation.

The migration application 86 is a specialized application providing the functionality of the migration controller 22 described above. In particular, the migration application 86 carries out higher-level logic and user-facing functionality of migration. For example, it may provide the above-mentioned command-line interface or application programming interface (API) for interacting with a human or machine user that exercises control over a migration process. In operation it communicates with the MP-DM plugin 91 of each host 10 to cause the MP-DM plugin 91 of each host 10 to perform lower-level operations pertaining to migration. One example is the above-discussed duplication or "cloning" of writes, used to maintain synchronization between the source LUN 20-S and the target LUN 20-T. Another is to prevent access to the target LUN 20-T prior to the migration becoming committed, as well as preventing access to the source LUN 20-S once the migration has become committed. The migration VM 81 of a given host 10 may call directly to the other hosts 10 through a so-called common information model object manager or CIMOM. More generically, a call may be made through a "listener" employing a migration-specific component that handles function invocations used to provide commands to the MP-DM plugin 91 at each migration step. Overall, communication is done by the migration VM 81 invoking each kernel action on each host 10 as needed, through each individual host's listener.

The hypervisor 83 in a host 10 such as shown in FIG. 9 may employ a construct known as a "datastore" in its use of storage devices 18. This construct is used by ESX, for example. A datastore is an organized container usable by the FS/LVM 89 to store files which implement virtual disks presented to the user VMs 82. Each datastore is assigned a unique "signature" which includes information identifying the device 18 on which the datastore resides. A signature is a set of information (metadata) written on the device 18 itself. For ESX, it includes a device identifier associated with the device 18 by the physical storage system (array) and which is returned in response to a SCSI extended inquiry command for vital product data (VPD page 0x83), for example. ESX writes this SCSI property onto the device 18 on which the datastore resides. When ESX accesses the datastore, it checks the signature included in the datastore against the device identifier as returned by the SCSI extended inquiry command for VPD page 0x83 for the device 18 on which the datastore resides. The values must match in order for the access to be handled normally. If there is a mismatch, ESX treats it as an error condition and does not complete the access. This is done to prevent a replica of the datastore being used in place of the actual datastore.

It will be appreciated that the datastore signature as described above is a location-dependent mechanism associating the datastore with the device 18 where the datastore is located. When a datastore is copied from a source LUN 20-S to a target LUN 20-T, the existing signature is also copied, so that the signature for the datastore as residing on the target LUN 20-T identifies the source LUN 20-S instead of the target LUN 20-T. If the datastore were accessed from the target LUN 20-T in this condition, the signature checking would fail, because the signature having the device identifier for the source LUN 20-S does not match the device identifier for the target LUN 20-T on which the datastore now resides. In order for the migration to be fully completed, the signature must be changed to include the device identifier of the target LUN 20-T instead of the device identifier of the source LUN 20-S.

In one embodiment, the disruptive process of FIGS. 7 and 8 may be used along with a separate "resignaturing" process that is performed while the migration is in the Committed and Redirected state 64. More comprehensively, the following sequence of actions may be performed:

a. Stop operation of all VMs 82 (of all hosts 10) for which the datastore is used as underlying storage
b. Resignature the datastore on the target LUN 20-T
c. Use the Undo Redirect command to transition the migration to the Committed state 58
d. Restart operation of the VMs 82

In other embodiments, another process may be used to effect resignaturing without requiring the stopping and starting of the pertinent VMs 82. In such a case, the non-disruptive process of FIGS. 4-5 may be used. It should also be noted that in other types of systems, notably the Windows® operating system from Microsoft, signatures are also employed but they do not include physical device identifying information and thus are location-independent. In this case also a non-disruptive process such as that of FIGS. 4-5 may be used, because the signature is copied to the target LUN 20-T as part of the migration.

While the above description focuses on use of signatures in particular in the system of FIG. 9, in alternative embodiments other associating mechanisms may be used and are handled in a corresponding manner. For example, the system may use device names such as described below, and in that case operations the same or similar to those described below may be used.

Figure 10:
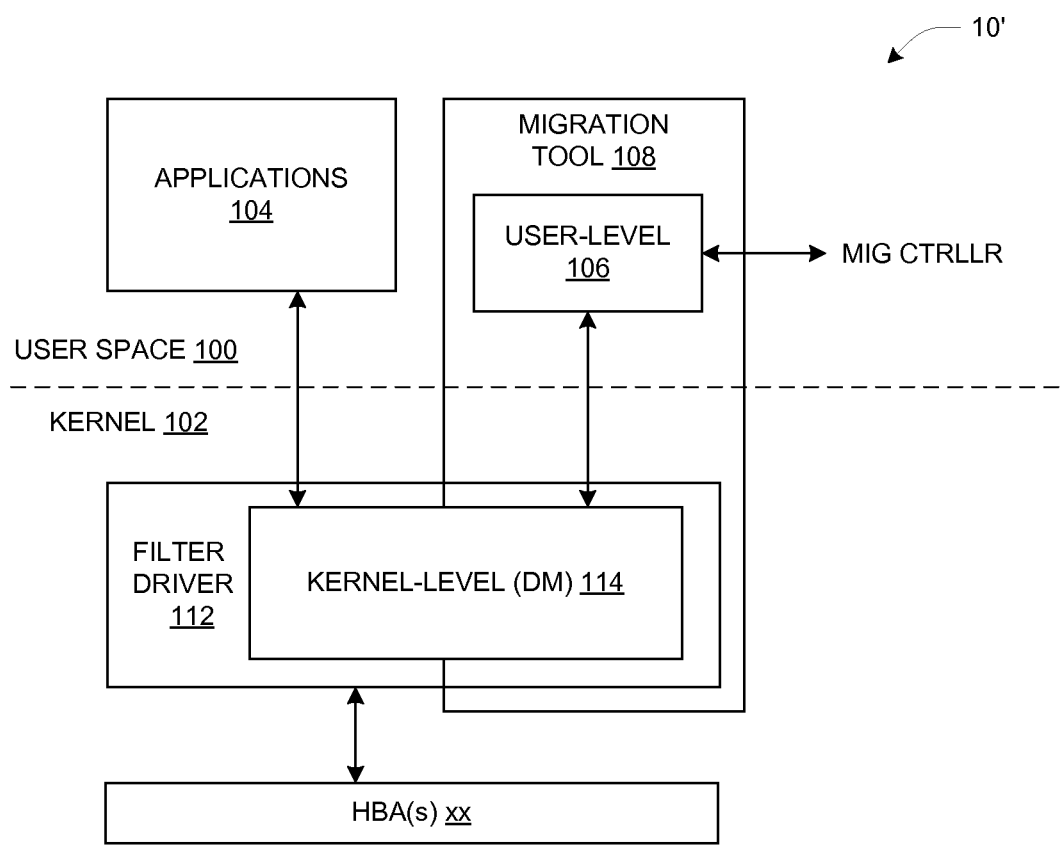

FIG. 10 shows an alternatively organized host 10' from a software perspective, i.e., a collection of software-implemented functional components as discussed above. The operating environment is divided between unprivileged user space 100 and privileged system or kernel space 102 as generally known in the art. In user space 100 resides one or more application programs (APPLICATIONS) 104 and a user-level part 106 of a migration tool 108. The applications 104 may be conventional user-level applications such as a web server, database application, simulation tool, etc., accessing data of the storage devices 18 (FIG. 1) using system calls as known in the art.

A filter driver 112 is a component working in conjunction with a standard device driver (not shown) as part of an operating system that implements the system calls, reading and writing data from/to the user devices 18 as requested by the applications 104. The filter driver 112 may provide specialized and/or enhanced input/output functionality with respect to the user devices 18. For example, in one embodiment the filter driver 112 may be a multipathing driver having an ability to access individual LUNs 20 via multiple paths, and it manages the use of the paths for increased performance and/or availability. An example of a multipathing driver is the above-mentioned PowerPath® driver.

The migration tool 108 contains functionality for data migration operations. The user-level part 106 carries out higher-level logic under control of the migration controller 22 (FIG. 1). A kernel-level part 114 of the migration tool 108 performs lower-level operation such as that provided by MP-DM plugin 91 (FIG. 9). The kernel-level part 114 may be realized in one embodiment as an extension component having a defined interface to a basic or core set of components of the filter driver 112.

It should be noted that the applications 104 may be virtual machines that contain user applications. Also, referring back to FIG. 9, although not shown there is a kernel space and there may be a user space.

As previously indicated, the migration controller 22 is a single point of control for migrations. It can reside in an off-host computerized device or "appliance", or in one of the hosts 10' in the cluster 12.

When the migration controller 22 is realized in an off-host migration appliance, then a migration is initiated at the appliance and the commands executed on each host 10' are subordinate commands. The above-described flows may be augmented as follows. During setup, a "-cluster" flag may be added to the Setup command 51 that lists the hosts 10' in the cluster 12. This command is executed on the appliance. The appliance in turn, calls Setup-cluster on each host 10' with another flag "-sub" (subordinate). This is a system-level command for communications between the appliance and hosts 10', not available to users. Alternatively, the API on the host 10' may be invoked with the same information. The "-sub" flag indicates to the host 10' receiving the command that the host 10' is only doing host-specific setup actions and not setting up the overall migration which happens only once from the appliance. For the Synchronize command 53, the user runs it on the appliance. The appliance in turn, invokes the Synchronize command 53 or API on each host 10'. Each host sets up the host-specific state for the synchronization. Once all hosts 10' have successfully performed these tasks, the appliance code invokes the technology-specific code to start the copy operation. The commit operation may require multiple staged operations at the hosts 10', i.e., commit-start, then commit-middle, and finally commit-end (the three phases discussed above with reference to FIG. 4). As for the other commands, during the Commit command 55 the appliance is the only place that technology-specific code is called. Cleanup follows the same pattern as synchronize, but there's no technology specific code. Undo Redirect, if used, also works like synchronize, because it is assumed that the application using the target LUN 20-T is not running when that command executes.

The above-referenced U.S. Pat. No. 7,904,681 provides two examples of mechanisms that associate application-visible data with a particular LUN. In one case an application (including a file system or logical volume manager) is configured with a native name of the source LUN 20-S and uses this name in all I/O commands for the associated data (e.g., database records). In this case, the minimally disruptive process of FIGS. 7-8 may be used for migration, and during the Committed and Redirected state 64 all applications using such a native name are stopped, reconfigured with the native name of the target LUN 20-T, and then restarted. In another case, applications are configured with a so-called "pseudoname" that is mapped by lower-level driver components to a particular LUN. In the present context, this mapping will initially associate the pseudoname with an identifier of the source LUN 20-S. The non-disruptive process of FIGS. 4-5 can be used, and the mapping changed as part of the transition from the Source Selected state 56 to the Committed state 58 as described above. While these mechanisms and operations are described with reference to a host similar to host 10', they may also be used in a host 10 of the type shown in FIG. 9.

While various embodiments of the invention have been particularly shown and described, it will be understood by those skilled in the art that various changes in form and details may be made therein without departing from the spirit and scope of the invention as defined by the appended claims.

What is claimed is:

1. A method of migrating data from a source logical unit (LUN) to a target LUN in a data processing system having a cluster of multiple host computers and a storage subsystem containing the source LUN and the target LUN, the data being accessed concurrently by software of the host computers using a mechanism in each of the host computers initially associating the data with the source LUN as the location of the data in the system, comprising:

performing a migration operation to migrate the data from the source LUN to the target LUN by
i) commanding a kernel-level migration component of each host computer to disable access to the target LUN and to begin cloning source LUN writes to the target LUN, each write to be cloned by writing a duplicate of each source LUN write to the target LUN, wherein the source LUN writes are application writes of new data,
ii) subsequently initiating a LUN copying operation and target LUN write coordination by an agent in the system, the LUN copying operation reading data from the source LUN in order of increasing block addresses and writing the data to the target LUN in multi-block chunks, the target LUN write coordination coordinating target LUN writes from the LUN copying operation with target LUN writes from the cloning of source LUN writes to ensure consistency between the source LUN and target LUN, wherein the target LUN write coordination includes maintaining pointers that divide the target LUN into a) a synchronized region containing chunks that have previously been copied from the source LUN to the target LUN, b) an in-progress region containing a chunk that is currently being copied from the source LUN to the target LUN, and c) a to-be-synchronized region having contents not yet copied from the source LUN to the target LUN, and wherein maintaining the pointers includes updating the pointers responsive to each chunk copied from the source LUN to the target LUN being completely stored on the target LUN, wherein the agent includes a control component and a datapath component, the datapath component residing in a physical storage array device with the target LUN and operative to perform the target LUN write coordination, wherein the datapath component residing on the physical storage array device with the target LUN coordinates target LUN writes from the LUN copying operation with target LUN writes from the cloning of source LUN writes to ensure consistency between the source LUN and target LUN at least in part by discarding those target LUN writes that result from the cloning of source LUN writes and are directed to the to-be-synchronized region of the target LUN, and returning an indication of success, with regard to the discarded target LUN writes, to hosts that initiated the discarded writes, and iii) upon completion of the LUN copying operation, commanding the kernel-level component of each host computer to stop the cloning of source LUN writes and to disable access to the source LUN by the host computer software in conjunction with a modification of the mechanism to newly associate the data with the target LUN as the location of the data in the system; and wherein each host computer clones each source LUN write to the target LUN at least in part by i) writing to the source LUN, ii) determining whether the write to the source LUN completed, and iii) in response to determining that the write to the source LUN completed, duplicating the source LUN write to the target LUN.

2. A method according to claim 1, performed in part by a migration appliance in communication with the host computers, the migration appliance being a computerized device executing computer program instructions of a migration controller application.

3. A method according to claim 1, wherein the control component resides on an agent appliance computerized device in communication with the hosts and the storage system and operative to perform the copying operation.

4. A method according to claim 1, wherein the target LUN write coordination includes:
for the in-progress region, delaying the cloned writes until the contents of the in-progress region have been copied from the source LUN.

5. A method according to claim 1, wherein the target LUN write coordination includes:
for the in-progress region, selectively discarding writes from the copy operation to ensure consistency between the source LUN and target LUN, wherein selectively discarding includes maintaining a record indicating, for each block of the in-progress region, whether the block is a written block from a cloned write, and discarding writes from the copy operation to blocks indicated by the record as written blocks.

6. A method according to claim 1, wherein:
each host executes one or more virtual machines;
the method is performed by one of the hosts executing a migration virtual machine on which a migration controller application runs;
the kernel-level component of each host includes a listener operative to receive control commands; and
the commanding of the kernel-level component of each host includes issuing commands from the migration controller application to the listener of the kernel-level component of each host.

7. A method according to claim 1, wherein:
each host has an operating environment divided between unprivileged user space and a privileged kernel space; the user space of each host includes one or more user applications and a user-level part of a migration tool, and the kernel space of each host includes a kernel-level part of the migration tool serving as the migration component, the user-level part of each host controlling operation of the kernel-level part of each host via migration-related system calls; and the method is performed by the user-level parts of the hosts under higher-level control of a single migration controller.

8. A method according to claim 1, wherein:
the data is organized as a datastore having a signature used by the software of the host computers; and
the modification of the mechanism includes a resignaturing process by which the signature is changed from a first signature initially associating the datastore with the source LUN to a second signature newly associating the datastore with the target LUN.

9. A method according to claim 8, wherein:
the signature includes physical device identifying information;
upon completion of the copying operation, redirection commences by which ongoing application accesses to the data as residing on the source LUN are redirected to the target LUN;
the resignaturing process is performed by temporarily stopping normal operation of the data processing system during the redirection; and
upon completion of the resignaturing process, the redirection is stopped and normal operation of the data processing system is resumed.

10. A method according to claim 1, wherein:
the data is accessed by the software of the host computers using a device name associating the data with the source LUN; and
the modification of the mechanism includes changing or remapping the device name to newly associate the data with the target LUN.

11. A method according to claim 10, wherein:
the device name includes physical device identifying information;
the software includes an application initially accessing the data using a first device name of the source LUN;
upon completion of the copying operation, redirection commences by which ongoing application accesses to the data as residing on the source LUN are redirected to the target LUN;
the method includes (a) temporarily stopping normal operation of application during the redirection and reconfiguring the application during the temporary stopping to use a second device name of the target LUN, and (b) subsequently stopping the redirection and restarting normal operation of the application.

12. A method according to claim 10, wherein:
the device name lacks physical device identifying information and the mechanism includes a name mapping initially mapping the device name to the source LUN; and
the method includes modifying the name mapping without interruption of normal operation of the software of the host computers between completion of the LUN copying operation and subsequent operation in which hosts accesses to the data are automatically directed to the target LUN by operation of the modified name mapping.

13. A method according to claim 1, wherein:
the mechanism is of a type requiring modification of the mechanism in a disruptive manner including interruption of normal operation of an application of the host computers;
upon completion of the copying operation, redirection commences by which ongoing application accesses to the data as residing on the source LUN are redirected to the target LUN;
the method includes (a) temporarily stopping normal operation of the application and making the modification to the mechanism during the redirection, and (b) subsequently stopping the redirection and restarting normal operation of the application.

14. A method according to claim 1, wherein:
the mechanism is of a type allowing for modification of the mechanism in a non-disruptive manner not requiring interruption of normal operation of an application of the host computers; and
the modification of the mechanism occurs without interruption of normal operation of the application of the host computers between completion of the LUN copying operation and subsequent operation in which host accesses to the data are automatically directed to the target LUN by operation of the mechanism as modified.

15. A method according to claim 1, wherein the target LUN write coordination further comprises:
allowing each cloned write to the synchronized region of the target LUN to be performed on the synchronized region of the target LUN; and
delaying each cloned write to the in-progress region of the target LUN until copying is complete for the in-progress region.

16. A method according to claim 1, wherein performing the target LUN write coordination further comprises:
allowing each cloned write to the synchronized region of the target LUN to be performed on the synchronized region of the target LUN;
allowing each cloned write to the in-progress region of the target LUN to be performed and maintaining a record identifying the blocks of the in-progress region that have been the object of a previous cloned write; and
for those blocks of the in-progress region of the target LUN identified as having been the object of a previous cloned write, discarding portions of copy operations corresponding to the previous cloned writes.

17. A system comprising:
at least one processor;
at least one memory for storing program code for, when executed on the processor, migrating data from a source logical unit (LUN) to a target LUN in a data processing system having a cluster of multiple host computers and a storage subsystem containing the source LUN and the target LUN, the data being accessed concurrently by software of the host computers using a mechanism in each of the host computers initially associating the data with the source LUN as the location of the data in the system, the program code comprising:
  program code for performing a migration operation to migrate the data from the source LUN to the target LUN including
    i) program code for commanding a kernel-level migration component of each host computer to disable access to the target LUN and to begin cloning source LUN writes to the target LUN, each write to be cloned by writing a duplicate of each source LUN write to the target LUN, wherein the source LUN writes are application writes of new data;
    ii) program code for subsequently initiating a LUN copying operation and target LUN write coordination by an agent in the system, the LUN copying operation reading data from the source LUN in order of increasing block addresses and writing the data to the target LUN in multi-block chunks, the target LUN write coordination coordinating target LUN writes from the LUN copying operation with target LUN writes from the cloning of source LUN writes to ensure consistency between the source LUN and target LUN, wherein the target LUN write coordination includes maintaining pointers that divide the target LUN into a) a synchronized region containing chunks that have previously been copied from the source LUN to the target LUN, b) an in-progress region containing a chunk that is currently being copied from the source LUN to the target LUN, and c) a to-be-synchronized region having contents not yet copied from the source LUN to the target LUN, and wherein maintaining the pointers includes updating the pointers responsive to each chunk copied from the source LUN to the target LUN being completely stored on the target LUN, wherein the agent includes a control component and a datapath component, the datapath component residing in a physical storage array device with the target LUN and operative to perform the target LUN write coordination, wherein the datapath component residing on the physical storage array device with the target LUN coordinates target LUN writes from the LUN copying operation with target LUN writes from the cloning of source LUN writes to ensure consistency between the source LUN and target LUN at least in part by discarding those target LUN writes that result from the cloning of source LUN writes and are directed to the to-be-synchronized region of the target LUN, and returning an indication of success, with regard to the discarded target LUN writes, to hosts that initiated the discarded writes, and
    iii) program code for, upon completion of the LUN copying operation, commanding the kernel-level component of each host computer to stop the cloning of source LUN writes and to disable access to the source LUN by the host computer software in conjunction with a modification of the mechanism to newly associate the data with the target LUN as the location of the data in the system; and
  wherein each kernel-level migration component of each host computer clones each source LUN write to the target LUN at least in part by i) writing to the source LUN, ii) determining whether the write to the source LUN completed, and iii) in response to determining that the write to the source LUN completed, duplicating the source LUN write to the target LUN.

18. A method according to claim 16, wherein maintaining the record identifying the blocks of the in-progress region that have been the object of a cloned write includes maintaining a bitmap identifying those blocks of the in-progress region that have been the object of a cloned write; and
wherein discarding portions of copy operations corresponding to the previously allowed cloned writes is responsive to the bitmap identifying those blocks of the in-progress region that have been the object of a cloned write.

19. A method according to claim 1, wherein commanding the kernel-level component of each host computer to stop the cloning of source LUN writes and to disable access to the source LUN by the host computer software in conjunction with a modification of the mechanism to newly associate the data with the target LUN as the location of the data in the system is in response to receiving a commit command from the user through a command line interface and causes the hosts to begin accessing a data resource stored in the data on the target LUN.

\* \* \* \* \*